United States Patent [19]
Levan

[11] Patent Number: 5,946,047
[45] Date of Patent: Aug. 31, 1999

[54] NETWORK SYSTEM FOR HANDLING DIGITAL DATA OVER A TV CHANNEL

[75] Inventor: William C Levan, San Jose, Calif.

[73] Assignee: Hybrid Networks, Inc., San Jose, Calif.

[21] Appl. No.: 08/820,347

[22] Filed: Mar. 12, 1997

[51] Int. Cl.⁶ ..................................................... H04N 7/08
[52] U.S. Cl. ......................... 348/473; 348/432; 348/724
[58] Field of Search .............................. 348/21, 473, 475, 348/486, 724, 434, 429, 433, 432; 455/47, 63, 108, 109, 204, 295; 375/301, 321; 332/170; 395/200.33, 200.47, 200.48

[56] References Cited

U.S. PATENT DOCUMENTS

| | | |
|---|---|---|
| 2,635,140 | 4/1953 | Dome . |
| 3,231,818 | 1/1966 | Court . |
| 4,104,681 | 8/1978 | Saylor et al. . |
| 4,186,415 | 1/1980 | Takayama . |
| 4,225,888 | 9/1980 | Takayama et al. . |
| 4,312,064 | 1/1982 | Bench et al. . |
| 4,484,328 | 11/1984 | Schlafly . |
| 4,589,011 | 5/1986 | Rzeszewski . |
| 4,638,358 | 1/1987 | Nozoe et al. . |
| 4,644,399 | 2/1987 | McCord et al. . |
| 4,907,218 | 3/1990 | Inoue et al. . |
| 4,928,177 | 5/1990 | Martinez . |
| 4,958,230 | 9/1990 | Jonnalagadda et al. ................. 348/724 |
| 4,985,769 | 1/1991 | Yasumoto et al. . |
| 5,063,446 | 11/1991 | Gibson . |
| 5,245,429 | 9/1993 | Virginio et al. . |
| 5,247,364 | 9/1993 | Banker et al. . |
| 5,287,180 | 2/1994 | White ...................................... 348/434 |
| 5,313,279 | 5/1994 | Wang et al. . |
| 5,327,462 | 7/1994 | Takahashi et al. . |
| 5,430,487 | 7/1995 | Naimpally ............................... 348/429 |
| 5,513,180 | 4/1996 | Miyake et al. . |
| 5,534,933 | 7/1996 | Yang ....................................... 348/433 |
| 5,557,318 | 9/1996 | Gabriël . |

*Primary Examiner*—Victor R. Kostak
*Attorney, Agent, or Firm*—Kile McIntyre & Harbin

[57] ABSTRACT

A network system or terminal device utilizes a unique modulation scheme that enables the transmission of digital data over a wireless, cable or direct broadcast satellite TV channel without disturbing quality of television signals. A digital data stream of the network, for example, is transparently transmitted in the television channel in a superfluous sideband segment of the frequency spectrum using a technique, herein called vestigial quadrature modulation (VQM), that entails substituting the vestigial sideband of a conventional television signal with a sideband of a data-encoded signal, preferably being QAM-modulated. A sufficient portion of the television sideband spectrum displaced by the substituted data signal, e.g., to at least the $7^{th}$ harmonic, is preserved for deriving sync information that is used both for clocking the digital data from the modulated data signal and for driving vertical and horizontal sync circuits of the television. A receiver in a network terminal device utilizes an interface that includes a channel splitter and SAW filters in each of respective data and video channels for separately processing the video and digital data signals. The sync signal clocks data from the data channel and an integer multiple thereof drives the horizontal sync circuits of a television set.

24 Claims, 8 Drawing Sheets

256 QAM MODULATOR

NETWORK SYSTEM FOR HANDLING DIGITAL DATA OVER A TV CHANNEL

BACKGROUND OF THE INVENTION

1. The Field of the Invention

This invention relates to the transmission and reception of high speed digital data, and more particularly combined with a composite TV signal such as that typically transmitted or broadcast in the U.S., Japan, Europe, or any other country utilizing fixed bandwidth channel transmission standards, e.g., NTSC, PAL and SECAM. More particularly, the invention relates to reallocation of a portion of a composite video signal, i.e., the vestigial sideband in a composite video transmission signal, for use as a high speed digital data subchannel.

2. Background of Related Art

The transmission of high speed data, e.g., 5 Mb/s, through a cable TV, wireless or broadcast TV channel is known. For instance, U.S. Pat. No. 5,247,364 discloses the dedicated use of TV channels for in-band data transmissions. U.S. Pat. No. 5,513,180 discloses time-division multiplexing of TV signals with various bit rate digital data sources. However, systems such as these assume unlimited transmission resources, i.e., an unlimited number of available TV channels, and make inefficient utilization of the existing TV channel resources. In many locales, all available TV channels are already utilized. Yet, the need to transmit high speed data through the existing cable TV or broadcast TV facilities persists, particularly with increased consumer demand for digital data services related to the use of the Internet. Moreover, in the U.S., local 'must carry' laws for cable companies essentially require cable companies to allocate some of their limited number of TV channels to local broadcasts, thus making fewer channels available for digital data transmission. Accordingly, a need exists to invisibly transmit high speed digital data along with a composite TV signal in the same channel without affecting the visible quality or content of the composite TV signal.

For decades, designers have been constrained by TV transmission standards chosen many decades ago, first with the development of monochrome TV, and then, in the 1950's and 1960's with the development of the transmission standards for color TV. To this end, typical TV broadcast channels are limited in bandwidth, e.g., to 6 MHz in the U.S.

Standards for TV signals utilized throughout the world have already 'squeezed' color TV signals into a fixed width channel which was originally designed for only black-and-white TV. For instance, to squeeze a larger bandwidth video signal into a fixed-width TV channel, conventional systems have bandwidth-filtered the lower sideband of the composite TV signal to form what is called a vestigial sideband (VSB). Thus, as is now well known, video modulation used in conventional television transmission apparatus amplitude-modulates (AM) an analog baseband signal to convert it into a double sideband (DSB) modulation signal, and limits the bandwidth of the lower sideband modulation signal using a band-pass filter included with an intermediate frequency circuit or a transmission frequency circuit, thus obtaining the vestigial sideband (VSB) modulation signal. The formation of the vestigial sideband from the larger lower sideband enables a video signal, e.g., an 8 MHz wide signal, to be transmitted in a smaller, fixed-bandwidth transmission channel, e.g., a 6 MHz bandwidth channel in the U.S.

In addition to bandwidth limiting an analog signal to obtain the VSB, it is also known to form a digital type vestigial sideband from a digital baseband signal. For instance, U.S. Pat. No. 5,327,462 discloses the formation of a vestigial sideband (VSB) modulation signal from a digital baseband signal.

Originally, the VSB modulation signal was formed using analog filters formed with inductors, capacitors and resistors. However, the edges of the filter were far from the ideal square wave and thus a fair amount of 'slop' was associated with the VSB, causing interference with the adjacent TV channel.

More recently, Surface Acoustic Wave (SAW) filter technology has been utilized to form the VSB because it exhibits very sharp edges (i.e., are closer to a square band-pass filter) as compared with filters formed from inductors, capacitors and resistors, at much lower cost. Thus, interference between adjacent channels was better avoided, but the full bandwidth of the TV channel, e.g., 6 MHz in the U.S., was still required to transmit a conventional composite signal over a TV channel.

TV channels have been 'squeezed' even further by a more recent implementation of stereo audio, i.e., left and right audio channels, as well as a secondary audio program (SAP)channel and a professional audio channel. As with the implementation of color TV, the stereo audio was implemented with backward compatibility, i.e., without rendering current TVs obsolete.

Other conventional systems utilize time-division multiplexing to insert digital data into the vertical blanking interval of a composite TV signal. The vertical blanking interval allows the intermittent placement of digital data in the composite TV signal. For instance, close-captioning or teletex systems utilize the vertical blanking interval of a composite TV signal. However, if the vertical blanking interval is already in use for providing close-captioning or other text services, then the channel cannot carry additional digital data. Moreover, this technique requires the cable or broadcast TV operator to have advance knowledge of whether or not the TV signal being carried in a particular channel is already utilizing the vertical blanking interval.

U.S. Pat. No. 5,063,446 discloses an apparatus to combine a digital audio signal with a standard TV signal. According to this patent, an auxiliary carrier is added to the video signal centered about 0.75 MHz below the video carrier. However, as shown in FIG. 1 of this patent, the auxiliary spectrum of the auxiliary carrier, while conditioned to occur between the spectral bands occupied by the luminance component, nevertheless affects to a certain extent the content of the composite TV signal. Moreover, while this technique is disclosed as being applicable to inserting an auxiliary audio channel having a frequency band of only a few tens of KHz, digital data in the several Mb/s range would likely obliterate the composite TV signal to too great an extent.

U.S. Pat. No. 4,907,218 proposes a system which superimposes a second carrier onto the first which is identical in frequency to the first carrier but different in phase by 90 degrees. However, as disclosed in the patent, such systems impair the composite TV.

Thus, the need exists to transparently transmit digital data at a high speed, e.g., 5 Mb/s, together with a conventional composite TV signal, in a single standardized TV channel, without affecting the quality or content of the composite TV signal.

SUMMARY OF THE INVENTION

A VQM digital data signal is combined in a transmission or broadcast medium with a composite TV or video signal. The vestigial sideband (VSB) signal of the composite TV or video signal is bandpass filtered to leave only the $7^{th}$ harmonic of the horizontal sync signal, for example, leaving only about 108 KHz (rounded up to as much as about 150 KHz) in the sideband of the U.S. standard signal. A modulated signal containing a high speed digital data stream, e.g., a QAM signal, is inserted into the spectrum of the TV channel beyond about the $7^{th}$ harmonic of the horizontal sync signal, i.e., beyond about 108 KHz below the carrier signal in the U.S. The insertion of data in the filtered-off vestigial sideband spectrum is referred to as vestigial quadrature modulation (VQM).

In the U.S. application (i.e., NTSC) of the present invention, the VQM signal utilizes about 708 KHz of the 6 MHz frequency spectrum, and is centered about 708 KHz below the carrier frequency. The average power of the VQM is about equal to the average power of the video signal, but of course not as great as that of the carrier frequency. Of course, the VQM signal can have a lower average power than that of the composite video signal in the TV channel, but should not exceed that of the carrier signal.

The use of VQM provides the cable, satellite, wireless and broadcast industries with the ability to further utilize the extra data handling capacity of TV channels. For instance, a typical cable system may be licensed to use 70 operational TV channels. Of those channels, many are often scrambled for premium services. Thus, in this typical system, the number of non-scrambled channels might be, say 50. Using VQM over those 50 channels could provide an additional 260 Mb/s of distributed data, or the equivalent of 170 T1 circuits. This amounts to a substantial revenue potential for a cable operator desiring to enter the data communication business. For the wireless operator, VQM could even reduce or eliminate the need for costly sectorization, or alternatively, provide substantial extra capacity.

Similar achievements may be had with PAL and SECAM by matching their respective signal and transmission parameters. In addition to cable and broadcast TV applications, it is also envisioned that the present invention can be applied to the transmission of video over telephone lines. Moreover, the VQM signal can be transmitted over any transmission medium, analog or digital. For instance, VQM signals can be digitized and transmitted over cable, satellite, cellular, optical paths, electromagnetic or microwave links or other high speed digital data transmission means.

The present invention is vastly superior to closed captioning technology. The present invention provides a continuous stream of data invisible to the underlying composite TV signal, whereas closed captioning is bursty in nature and can use only low order modulation, i.e., Amplitude Shift Keying (ASK). The present invention also provides the ability to implement quadrature amplitude modulation (QAM) for the transmission of higher speed data. Closed captioning is limited to transmission of non-contiguous data in the tens of kilobits/second range, because closed captioning and similar technology places digital data only in the vertical blanking interval. Such systems can never be continuous or even near being continuous. The present invention provides a continuous transmission of data at rates of more than five Mb/s.

This summary is not intended to limit the invention to any extent beyond that defined in the appended claims.

BRIEF DESCRIPTION OF THE DRAWINGS

The invention will be described with reference to the drawings, in which.

DESCRIPTION OF ILLUSTRATIVE EMBODIMENTS

The present invention is described with reference to the current U.S. TV signal standard, NTSC. However, those skilled in the art would readily recognize that the techniques and apparatus described herein are equally applicable to the different TV signal standards used around the world, e.g., PAL and SECAM. Thus, for simplicity's sake, a detailed description of the application of the present invention to other TV signal standards and the resultant specific values for frequency for removing a portion of the vestigial sideband and inserting therefore modulated digital data is left to those skilled in the art.

Figure 9:
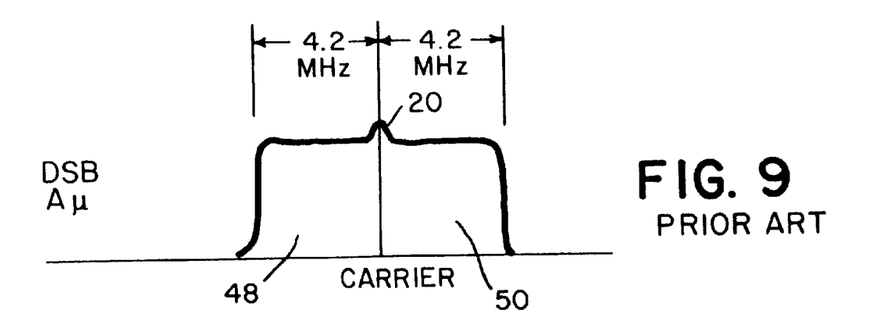
FIG. 9 shows a conventional dual sideband IF video signal after amplitude modulation.

Conventional composite TV signals are amplitude modulated (AM) with an intermediate frequency, resulting in dual sideband signals as shown in the frequency spectrum depiction of FIG. 9, wherein the sidebands are centered around a carrier frequency 20 of 45.75 MHz. Thus, the unfiltered TV signal would require a total of 8.4 MHz of bandwidth. Unfortunately, most TV signal standards do not provide that much bandwidth. For instance, the U.S. standard TV channel is only six MHz wide, dating back to the early days of black and white TV.

Figure 10:
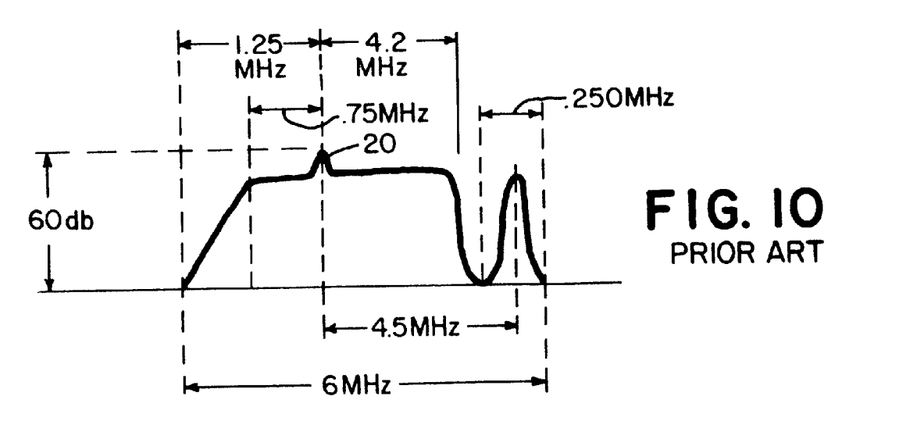
FIG. 10 shows a conventional composite video signal having a vestigial sideband.

To squeeze the conventional color TV signal into a six MHz (U.S.) or other limited bandwidth TV channel, the lower sideband (shown on the right in the intermediate frequency) is conventionally clipped so that only 1.25 MHz of the lower sideband remains, as shown in FIG. 10. The 1.25 MHz remaining portion of the lower sideband is commonly referred to as the 'vestigial sideband' (VSB).

The audio portion of the conventional composite TV signal is unaffected by the present invention. Thus, the audio portion conventionally utilizes about 500 KHz of the TV channel's frequency spectrum as shown in FIG. 1.

Vestigial Quadrature Modulation (VQM)

Figure 1:
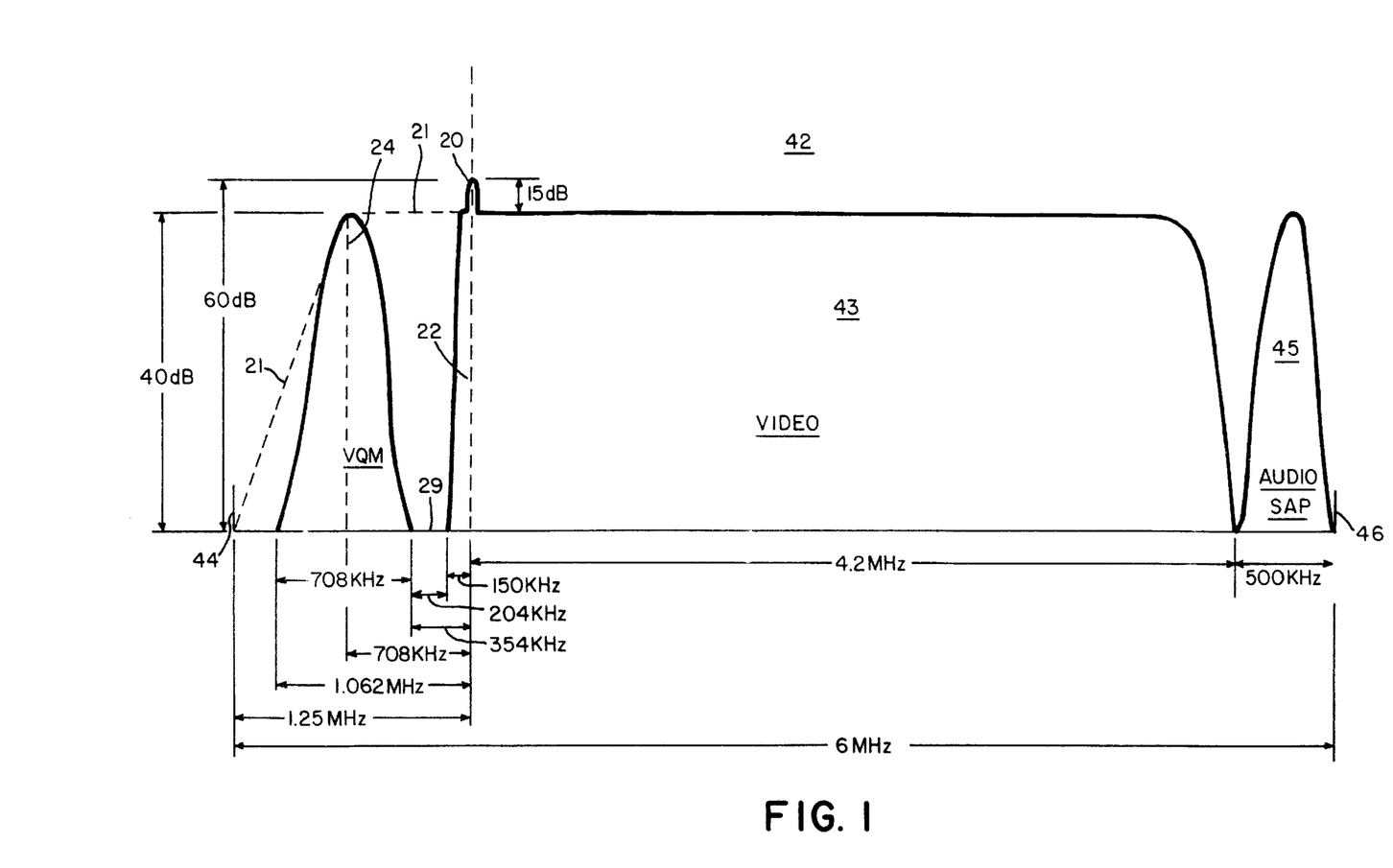
FIG. 1 shows the spectral distribution of a composite video signal under one TV channel standard, NTSC, with the vestigial sideband removed and VQM data inserted therefore.

FIG. 1 shows the spectral characteristics of a single TV channel to which the present invention is applied. FIG. 1 depicts the present invention in a channel, not as in the inverted IF spectrum.

In FIG. 1, a composite TV signal has a large portion of the vestigial sideband, as indicated by ghost envelope 21, removed. This removal is accomplished by bandpass filtering either the full DSB(AM) signal or by filtering the vestigial sideband signal. As will be described in more detail, a small portion 22 of the vestigial sideband must remain to allow reconstruction of the vertical and horizontal sync signals from the composite TV signal.

According to the present invention, modulated digital data contained in envelope 24 is inserted in the frequency spectrum otherwise occupied by the vestigial sideband as shown in FIG. 1. Any modulation system which incorporates amplitude, frequency and/or phase may be used.

In the present embodiment, the digital data is quadrature amplitude modulated (QAM) and is synchronized to the horizontal sync signal of the accompanying video signal. The use of the vestigial sideband frequency spectrum for quadrature modulated data in accordance with the present invention is hereinafter referred to as 'vestigial quadrature modulation' or 'VQM'.

Figure 2A:
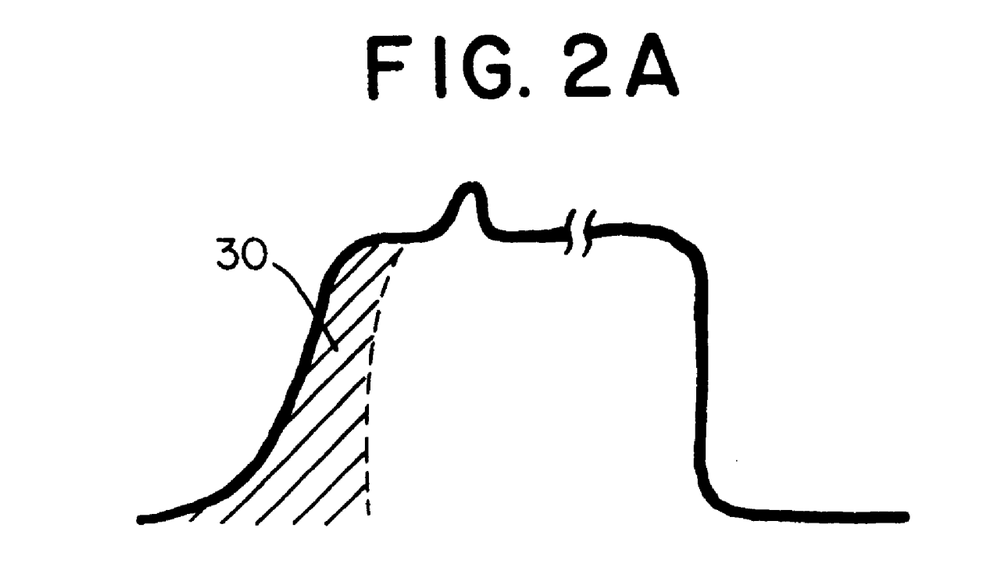
FIGS. 2A and 2B depict the average power spectrum of the removed portion of the vestigial sideband and the inserted VQM data, respectively.
Figure 2B:
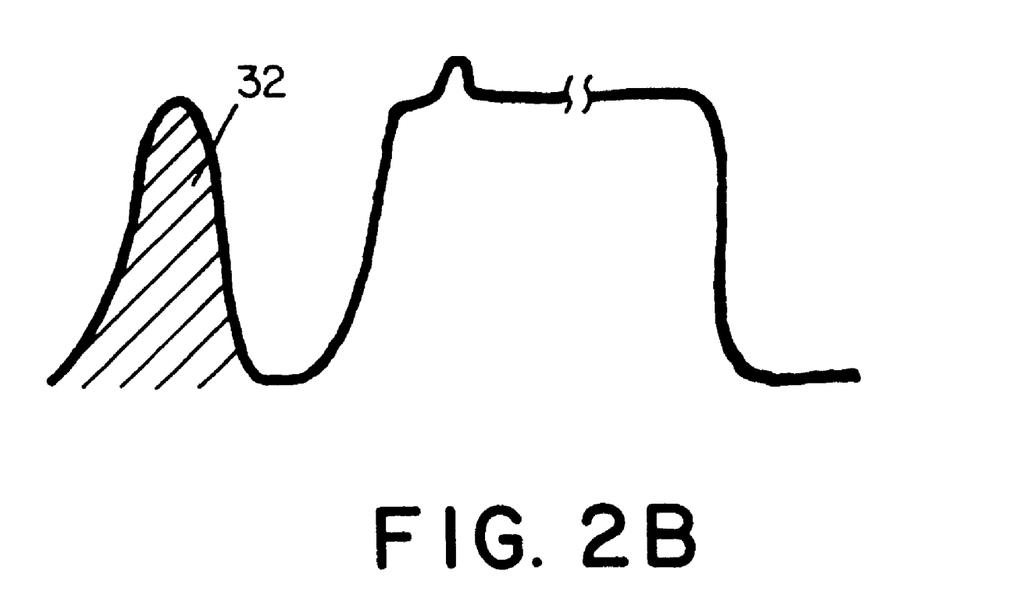

The respective shaded portions of the envelopes of FIGS. 2A and 2B show that the amount of average power removed from the vestigial sideband 30 is about equal to the amount of average power added to the channel in the VQM portion 32. The peak power of the modulated digital data is about 40 dB, and should not exceed the level of the carrier signal, i.e., 60 dB in the current U.S. standard. It is important that the amount of average power in the VQM portion 32 not significantly exceed the amount of average power removed from the vestigial sideband 30, e.g., to a cable operator who would want to prevent saturation of conventional amplifiers adjusted for conventional composite TV signals. In this way, no significant adjustment of the amplifiers should be necessary. Moreover, this should ease the acceptance of VQM in countries around the world because of the minimal change in the use of the frequency spectrum.

Referring back to FIG. 1, the U.S. standard NTSC television channel is six MHz wide. The video portion 43 of the channel starts 1.25 MHz above the lower edge 44 and extends to 5.45 MHz (1.25+4.2=5.45 MHz) above the lower edge 44. The audio portion 45 of the channel is centered 5.75 MHz above the lower edge 44 and occupies a total bandwidth of 500 KHz.

The reason for eliminating one sideband is to minimize the required channel width. The reason for starting the video 1.25 MHz above the lower edge 44 in the U.S. dates back to the NTSC specification of 1940. At that time cost-effective transmitter and receiver filters could not produce the sharp skirt characteristics required for the total elimination of the lower sideband 48 (shown in FIG. 9) created by the amplitude modulator. Before the implementation of SAW filters, broadcast TV channels, although filtered to fit into six MHz channels, in reality spread as much as eight MHz. A cost/accuracy trade-off was made between the sharpness of the filter and acceptable cost. As a result, because adjacent TV channels are not conventionally separated by any frequency spectrum, adjacent channels would interfere with one another, particularly if two adjacent spectrum channels were assigned to broadcast TV stations located in a common viewing area. To help avoid adjacent channel interference, neighboring broadcast TV channels using contiguous channels (e.g., channels 2 and 3) were avoided within a common viewing area.

However, with the advent of SAW filter technology, the accurate, sharp edges otherwise seen in analog filters requiring at least 30 poles reduces greatly any interference between adjacent TV channels. SAW filters are very economically priced as opposed to an equivalent analog filter. Thus, with sharper filter technology, it has been found that most of the 1.25 MHz vestigial sideband can be recovered and used for other services. However, careful attention must be given to the use of this recovered area to avoid potential interference with the signal quality of the composite TV signal. Vestigial Quadrature Modulation (VQM) as disclosed herein provides an acceptable use of the recovered area without causing interference.

A standard video signal drives a double sideband modulator to produce a conventional double sideband AM signal centered at 45.75 MHz. Using a SAW filter the lower sideband 48 (FIG. 9) is limited to about 150 KHz, thus freeing 1.1 MHz of bandwidth for QAM service to implement the vestigial quadrature modulation (VQM) of the present invention. VQM places a coherent quadrature amplitude modulated (QAM) subcarrier in the freed vestigial portion of the television channel. This freed bandwidth may also be used to accommodate other modulation schemes for carrying data or other signals. The present invention broadly includes use of the vestigial sideband to carry information of any nature and of any modulation concurrent with a composite video signal in a TV channel, or the like.

Figure 11:
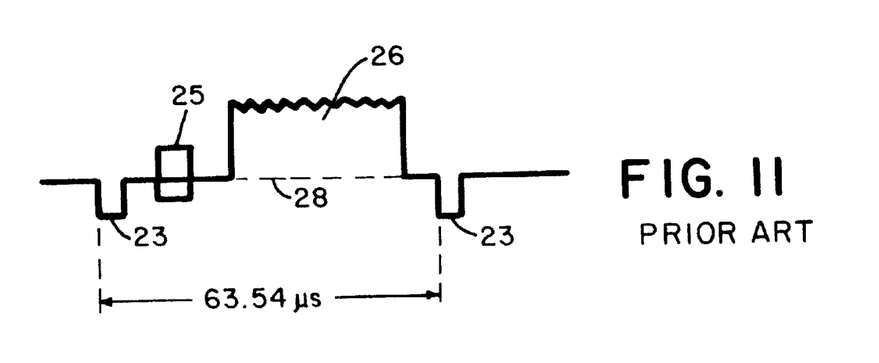
FIG. 11 shows a conventional composite video signal including horizontal sync and colorburst signals.

As shown in FIG. 11, the U.S. NTSC standard utilizes a vertical sync of 59.94 Hz (525 lines interleaved), and a horizontal sync pulse 23 of 15734.265 Hz. The horizontal frame of the TV composite video signal includes the colorburst signal 25 at 3.579 MHz and the active video region 26 above the blanking level 28. The TV receiver detects the horizontal sync by detecting an edge of the square wave of the horizontal sync pulse 23, which is clamped to a known DC level, i.e., the "super black" level. The TV receiver also detects the vertical sync signal. Thus, conventional TVs require two basic mechanisms to synchronize to the TV composite signal (three if you count colorburst): horizontal sync and vertical sync.

The inventor hereof has calculated the minimum amount of the vestigial sideband of a TV signal necessary to reconstruct the vertical and horizontal sync signals of a TV signal to an acceptable level. To reconstruct all necessary frequencies of the square waves of the horizontal and vertical synchronization signals, the inventor has found that only about the $7^{th}$ harmonic is required. Thus, the remaining portion of the vestigial sideband beyond the $7^{th}$ harmonic of the horizontal and vertical synchronization signals is available according to the present invention for an alternative use.

Accordingly, the SAW filter utilized to clip the lower sideband of the video signal and thus form the minimum necessary amount of vestigial sideband must pass the $7^{th}$ harmonic of the highest frequency as between the horizontal and vertical sync signals. Of course, the horizontal sync signal is the higher frequency as between the horizontal sync and the vertical sync. Thus, the remaining vestigial sideband must extend out to about the $7^{th}$ harmonic of the horizontal sync.

In the example of the present invention, the $7^{th}$ harmonic of the vertical sync in the U.S. would require:

$$59.94 \text{ Hz} \times 7 = 0.41958 \text{ KHz}$$

which is of no interest because the horizontal sync is much larger. The $7^{th}$ harmonic of the horizontal sync requires $$25{,}734.265 \times 7 \approx 108 \text{ KHz}$$

Thus, it is determined that only about 108 KHz of the vestigial sideband is required at the receiver for detection of the vertical and horizontal sync signals.

The conventional vestigial sideband is 1.25 MHz (1250 KHz) wide, and thus, it is determined, that as much as 1250 KHz−108 KHz=1.142 MHz of bandwidth of the vestigial sideband can be freed and thus utilized for other services, e.g., for the transmission of digital data. To provide an adequate margin for the $7^{th}$ harmonic of the horizontal sync to be safely recovered by the TV receiver, the inventor hereof arbitrarily rounds the 108 KHz up to about 115 KHz, and contemplates a range of the vestigial sideband of between about 115 KHz to about 150 KHz. The embodiment of FIG. 1 shows a remaining vestigial sideband of 150 KHz. If more of the vestigial sideband beyond about 150 KHz is left, the video component of the VSV would tend to degrade the quality of the QAM data component because of introduced noise. The resulting guardband between the lower edge of the vestigial sideband and the upper edge of the VQM data provides an allowance for inaccuracy in components, filters, etc. due to aging, temperature, or other factors. Of course, a larger or smaller guardband may be used depending upon the accuracy of the components and the system.

In dual sideband (DSB) AM, the same 'intelligence' of the composite video signal is contained in both the upper and lower sidebands. Thus, the video signal itself can be transmitted in only one sideband. The vestigial sideband allows a TV receiver to reconstruct horizontal and vertical sync, and to allow recovery of the carrier signal. Thus, according to the present invention of making use of the available spectrum in the vestigial portion of the spectrum, for the U.S. NTSC standard, it is determined that only about 150 KHZ of the VSB is necessary, and that 1.250 MHz−150 KHz=1.1 MHz of the conventional 6 MHz TV signal can be utilized for other purposes, e.g., for the transmission of high speed digital data.

Thus, the present invention utilizes a sharper SAW filter to pass a vestigial sideband of only about 0.150 MHz (U.S. standard) to open a 1.1 MHz bandwidth area within each TV channel.

Having created a 1.1 MHz bandwidth subchannel residing within a conventional composite TV signal, the subchannel could be utilized in many ways. One use of the subchannel is for the transmission of high speed data, e.g., 5 Mb/s modulated digital data as disclosed by the embodiments of the present invention.

VQM signals can be transmitted over any transmission system, analog or digital. For instance, VQM signals can be digitized and transmitted over satellite, microwave or other high speed digital data transmission systems. The receiving system may also be analog or digital.

Transmitter

Figure 3:
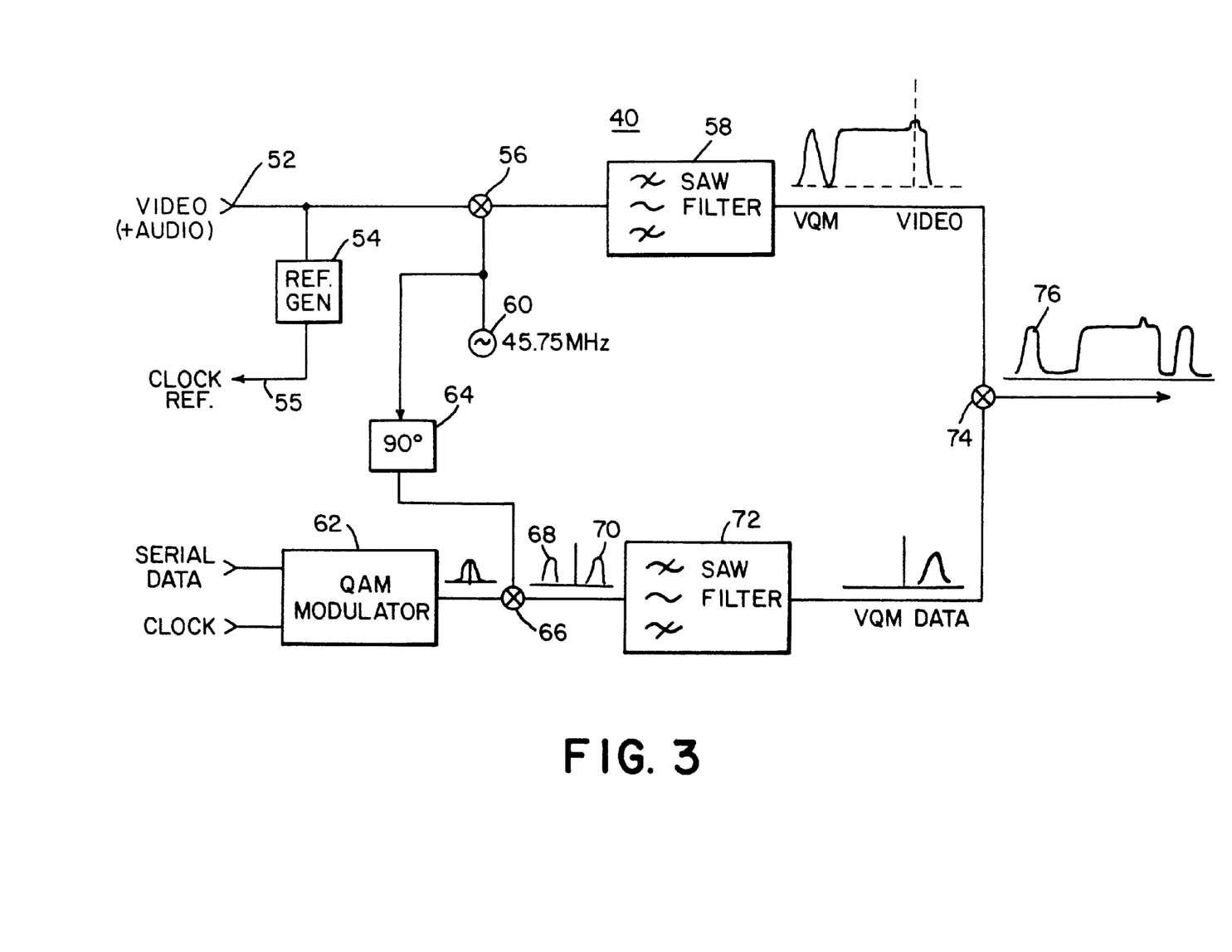
FIG. 3 shows a transmitter which frequency multiplexes a conventional composite video signal with high speed digital data for insertion into the vestigial sideband of a single TV channel.
Figure 4:
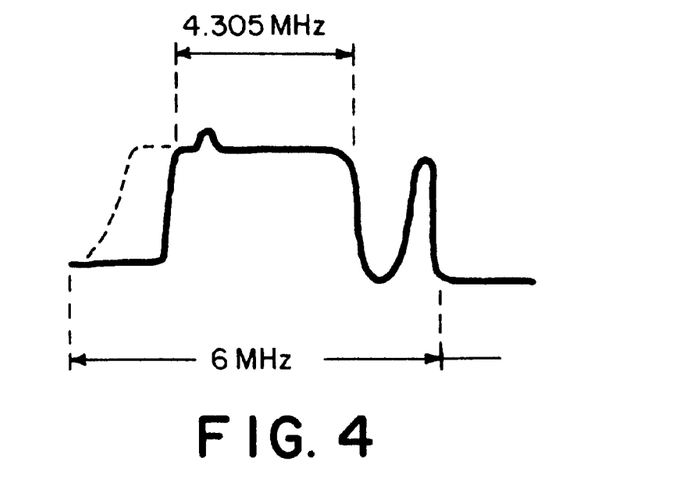
FIG. 4 shows the resultant composite TV signal after SAW-filtering most of the vestigial sideband according to the present invention.
Figure 5A:
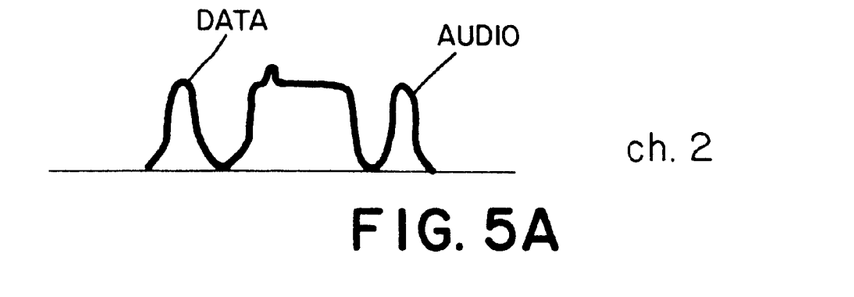
FIGS. 5A and 5B show the inverted nature of the composite TV signal with respect to the Intermediate Frequency (IF), respectively.
Figure 5B:
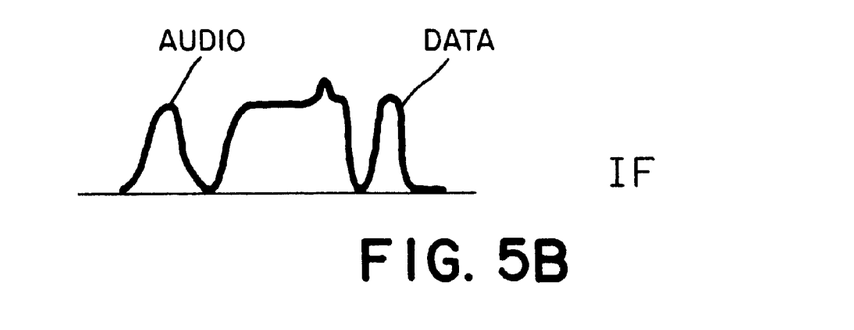

FIG. 3 shows one embodiment of a transmitter 40 (or demodulator side) which filters a conventional composite TV signal in accordance with the present invention and inserts VQM digital data 24 in a portion of the sideband spectrum vacated by the VSB component of a composite TV signal.

A conventional video signal or composite TV signal is input at video signal input 52. A reference generator 54 detects the horizontal sync from the video signal and provides a clock reference signal to the data timing train so that the digital data is synchronized with the video or composite TV signal. Although the vertical sync signal could be used, it would provide an acquisition time which is extremely slow as compared with the horizontal sync signal. The clock signal output from the reference generator 54 clocks the data source, e.g., at the point of presence (POP). In the present embodiment, the reference generator 54 multiplies the horizontal sync signal by 320 to output a clock reference signal 55 which is equal to 15.734 KHz×320=5.034 MHz, or equal to the digital data rate. This clock reference signal 55 is used as a clock source for the clock signal input into the QAM Modulator 62, which is also 5.034 MHz. The clock signal input into the QAM Modulator clocks in the serial data input into the QAM Modulator.

The QAM signal can be centered anywhere up to about 800 KHz, having a bandwidth equal to the center frequency. In QAM, the symbol rate equals the occupied bandwidth. 708 KHz was chosen to provide integer multiples for the reference generators 54 (FIG. 3) and 144 (FIG. 8) or 320 and 360, respectively. Moreover, 708 KHz relates to the data rate as follows:

Aggregate data rate/# bits per symbol=(360×15734)/8=708 KHz

The conventional video or composite TV signal is modulated by an intermediate frequency carrier 60 at 45.75 MHz (U.S.) in multiplier 56. The dual sideband signal (or vestigial sideband signal of a conventional composite TV signal) from the multiplier 56 is passed through a video SAW filter 58, a bandpass filter which is adjusted to filter off most of the lower sideband, i.e., all but about 150 KHz of the lower sideband. The video SAW filter 58 conventionally has a 5.45 MHz bandwidth, but is set to have a bandpass 4.35 MHz bandwidth in the present embodiment. The video SAW filter 58 used in the present embodiment is a SIEMENS P/N X6955M, or in particular B39435X6955M100. Other features of the video SAW filter 58 are fc=43.50 MHz and 3dB BW=4.35 MHz, 30BW=5.7 MHz, IL=11dB, Zi=50 ohms, Zo=2K//3p. These values are the same for the video SAW IF filter assembly 114 shown in FIG. 8. It will be understood that the particular SAW filter used will vary, e.g., depending upon the TV standard, e.g., because of the different center frequencies used in different countries.

Figure 7A:
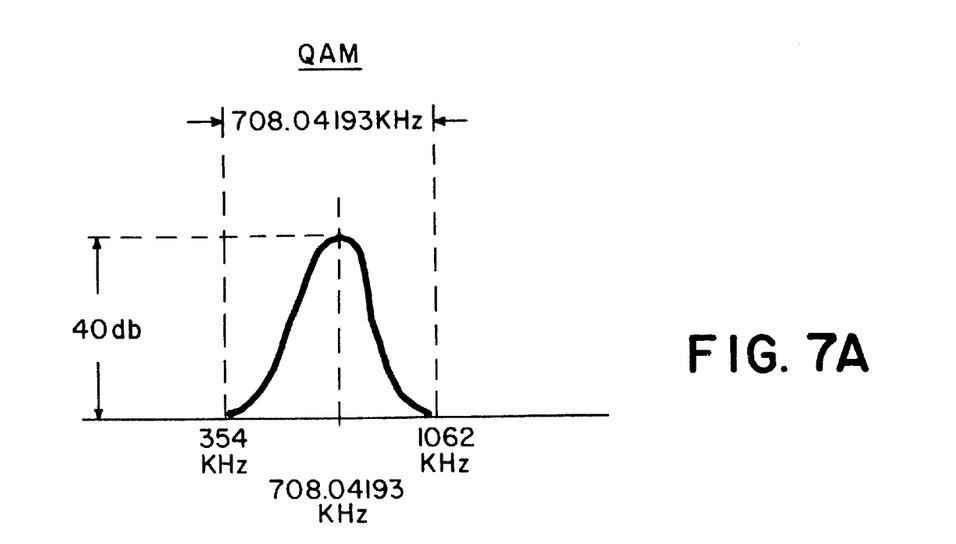
FIGS. 7A to 7C depict the frequency spectrum of the digital data before modulation by the carrier frequency (FIG. 7A), after modulation by the carrier frequency (FIG. 7B), and after passing through a SAW filter (FIG. 7C)

A serial stream of digital data, e.g., a 5.034 Mb/s serial stream of digital data is quadrature amplitude modulated by QAM modulator 62. FIG. 7A shows the QAM digital data from the QAM modulator 62, centered at 708.04193 KHz and having a spectrum bandwidth of 708.04193 KHz. These values are particularly advantageous with respect to the U.S. standard TV signal, but can be larger or smaller depending upon the particular TV standard used, e.g., PAL or SECAM, and the amount of guardband desired.

Figure 7B:
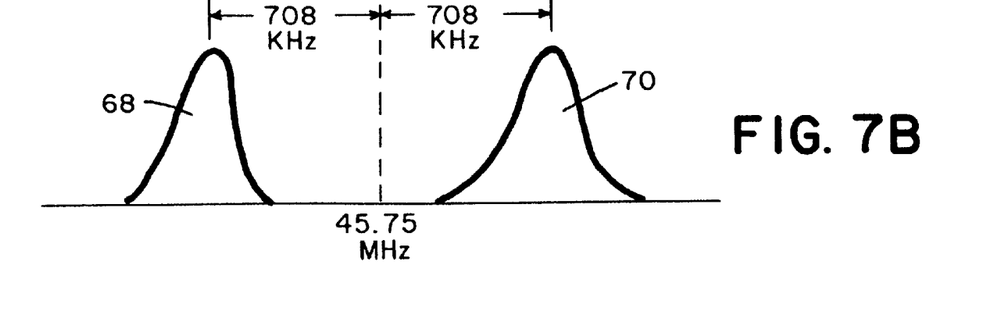

The QAM modulated data from the QAM modulator 62 is modulated by the same intermediate frequency carrier 60 as is the video signal 52, but shifted in phase by 90 degrees by a phase shifter 64. The phase can be shifted either +90 degrees or −90 degrees. It is important to shift the phase of the carrier frequency from that used for the video for purposes of recovering the data at the receiver. Modulation is performed in a multiplier 66, with the resulting double sideband signal being shown in FIG. 7B. The output of multiplier 66 has a lower QAM sideband 68 and an upper QAM sideband 70 formed by the modulation. The lower and upper QAM sidebands 68, 70 are centered at about 46.5 MHz and 45.0 MHz, respectively. It is important to suppress the carrier in the data component so that only the upper sideband is allowed to pass through the SAW filter 72. The carrier suppression is carried out in the multiplier 66, which acts as a balanced modulator.

The multiplier 56 is not in perfect balance to set the pilot tone level for the video pilot carrier.

Figure 7C:
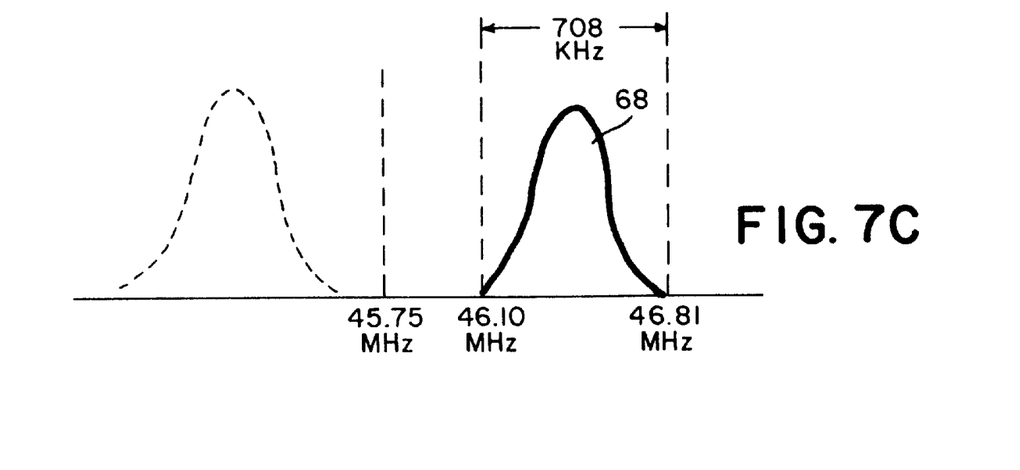

The double sideband signal from the multiplier 66 is passed through data SAW filter 72, which is a bandpass filter centered at 46.5 MHz with a bandwidth of about 1 MHz, and which filters off and thus eliminates the lower QAM sideband 68, thus providing only the upper QAM sideband 70 as shown in FIG. 7C. The Data SAW filters 72 and 112 have a center frequency fc=46.460 MHz and a 3dB bandwidth of 725 KHz.

The video IF signal from the video SAW filter 58 is added to the remaining 46.5 MHz center frequency component of the VQM data signal from the data SAW filter 72 at a level similar to the audio portion of the IF, by multiplexer 74, to form the VQM signal 76 including digital data and video for transmission. This composite IF feeds a conventional up-converter for cable, broadcast, and wireless applications.

Either a video signal or a conventional composite TV signal can be input to the video input 52 of the transmitter 40, so long as the video signal is properly conditioned.

Thus, according to the transmitter of the present invention, a high speed digital data stream, e.g., QAM modulated digital data, can be inserted into a subchannel formed in a portion of a TV channel where the vestigial sideband of a composite TV signal would otherwise be conventionally located.

QAM Modulator

Figure 6:
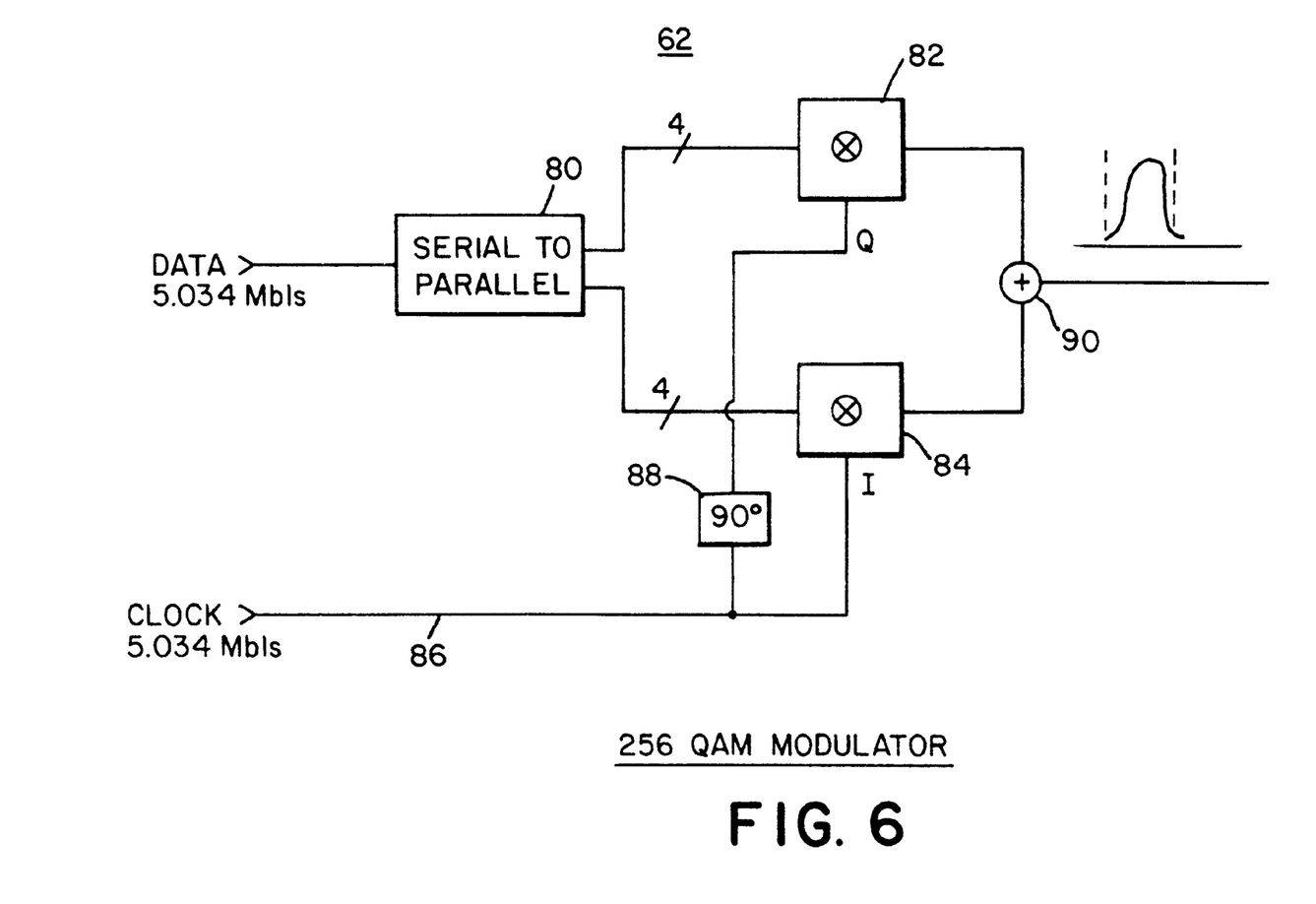
FIG. 6 shows the quadrature amplitude modulator QAM utilized for modulating the high speed data.

One embodiment of a data modulator, QAM modulator 62, is shown in FIG. 6. The QAM modulator may be a 4, 16, 64, 256, etc. QAM modulator. In the present embodiment, the QAM modulator 62 is a 256 QAM modulator. The QAM modulator 62 is used as a doubly-balanced mixer, otherwise known as a 'Gilbert Cell'.

A serial data stream of 5.034 Mb/s is input to a serial-to-parallel converter 80. The serial-to-parallel converter 80 is a ring counter formed by AND gates to direct serially-received bits to the Q or I channel component.

If a 4 QAM modulator were being used, the serial-to-parallel converter 80 would form two parallel bits: 1 bit for the Q channel and 1 bit for the I channel. If a 16 QAM modulator were being used, the serial-to-parallel converter 80 would form four parallel bits, two parallel bits for the Q channel and two parallel bits for the I channel. In the case of a 64 QAM modulator, the serial-to-parallel converter 80 would form six parallel bits of data: three bits for the Q channel and three bits for the I channel. In the present embodiment, a 256 QAM modulator is used, wherein eight parallel bits of data are formed: four bits for the Q channel and four bits for the I channel.

As the QAM increases from 4 to 16 QAM, 16 to 64 QAM, etc., the symbol rate decreases accordingly while the data rate increases. However, for every doubling of the QAM (e.g., from 4 QAM to 16 QAM), the signal-to-noise (S/N) ratio would double to achieve a bit error rate equivalent to the lower rate QAM. The rate and other features of the QAM modulation are adjusted by jumpers in the present embodiment, but could be controlled by a computer.

The parallel bit(s) from the serial-to-parallel converter 80 on the I channel are input to a multiplier 84 and clocked by the clock signal 86. The clock signal 86 is synchronized and referenced to the horizontal sync of the composite TV signal. Thus, the digital data inserted transparently into the composite TV channel is referenced to the horizontal sync.

The parallel bits from the serial-to-parallel converter 80 on the Q channel are input to a multiplier 82 and clocked by clock signal 86 shifted by 90 degrees by phase shifter 88. The outputs from multipliers 82, 84 are mixed in mixer 90, and output as a 256 QAM signal.

The rate of the 256 QAM modulator 62 is 708 Kilosymbols/second, and the output signal is centered at 708.04193 KHz, and has a bandwidth of 708.04193 KHz. Thus, the output signal has a lower edge at about 354 KHz, and an upper edge at about 1062 KHz, as shown in FIG. 7A. The symbol rate of 708 Kilosymbols/second provides an aggregate data rate of 5.664 Mb/s, which includes a digital data rate of 5.034 Mb/s together with error correction. Some commercially available QAM modulators/demodulators, such as one available from BROADCOM, e.g., BROADCOM Model 3115, has error correction built in. For other commercially available QAM modulator/demodulators such as are available from NATIONAL or HITACHI, forward error correction is a separate chip set. Sometimes, but not necessarily, forward error correction is stored in a field programmable gate array (FPGA). Any conventional error correction scheme may be used, and indeed error correction is not absolutely required but is recommended. In the present embodiment, the error correction includes the calculation of a checksum which requires 12.5% overhead for error correction.

Thus, 708.04193 Kilosymbols/second times eight bits per symbol =5.664 Mb/s aggregate data rate, including the overhead for error correction. Thus, less the 12.5% overhead for error correction with the 256 QAM, a usable digital data rate of 5.034 Mb/s is provided by the present embodiment. Accordingly, the maximum data rate of the digital data input to the serial-to-parallel converter 80 shown in FIG. 6 can be up to 5.034 Mb/s in the present embodiment.

A data rate of 5.034 Mb/s can support two MPEG video channels. MPEG is a compression scheme which transmits a reference frame, and then for each subsequent frame only the differences from the frame before. MPEG technology is currently used in satellite TV systems. Thus, the present invention provides the ability to transmit at least three simultaneous programs, the composite TV signal and two additional MPEG video channels, via a single TV channel.

As shown in FIG. 1, a guardband 29 is provided between the remaining small portion of the VSB 22 and the envelope 24 of the modulated digital data to protect against interference between the two adjacent components. Interference might otherwise be caused by variances in the components due to aging, temperature, environmental changes, inaccuracy or other well known factors. Although this guardband 29 can vary, the present embodiment provides a guardband 29 of 204 KHz.

Receiver

Figure 8:
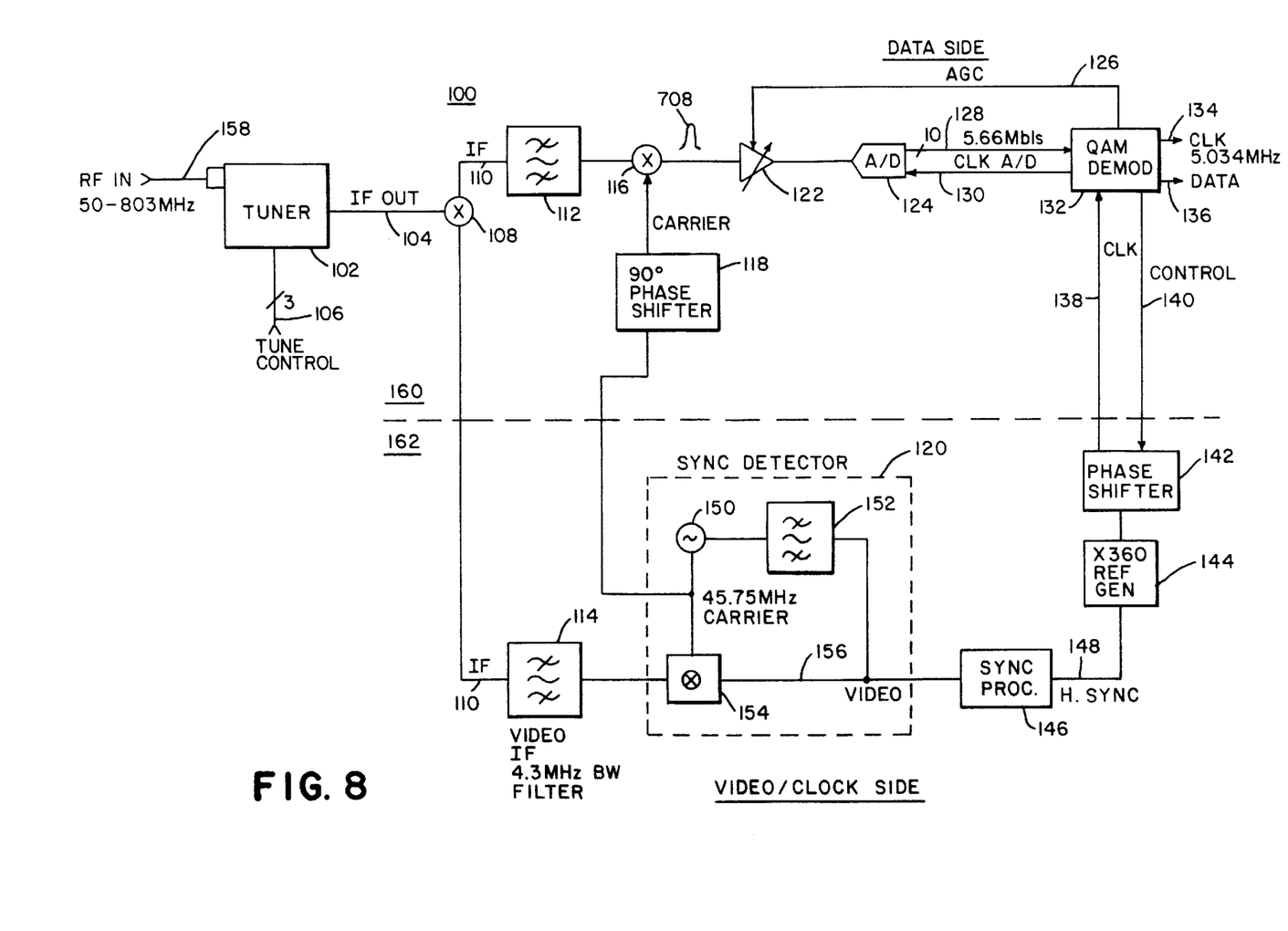
FIG. 8 shows a receiver (demodulator) for receiving and demodulating the VQM signal from the composite video signal.

FIG. 8 depicts one embodiment of a receiver 100 (or demodulator side) which receives a VQM composite TV signal including both digital data and composite video in accordance with the present invention.

Referring to FIG. 8, the received VQM composite TV channel RF 158 is input to a tuner 102. The tuner 102 is a conventional TV tuner, e.g., which can receive channels 2–118 (69 broadcast or cable channels plus cable only channels). For example, conventional tuners such as those available from SONY Corporation, SHARP, TELEFUNKEN, PANASONIC and HITACHI are acceptable. The particular tuner used in the present embodiment is that available from SHARP, a dual conversion tuner, Part No. CADD27U06.

The tuner 102 is controlled via tuner controls 106. The tuner 102 provides course gain adjustment in addition to wideband channel conversion to an intermediate frequency (IF) output signal 104 which is centered at 44 MHz and having a bandwidth of from 41 to 47 MHz. The tuner 102 forms a dual conversion block down converter which converts a selected six MHz TV channel between 50 and 803 MHz to a six MHz IF channel.

The IF output signal 104 is input to a two-way power divider 108 which splits the IF output signal 104 between the data side 160 of the receiver 100 and the video/clock side 162 of the receiver 100. Thus, one output of the two-way power divider 108 is input to the data SAW IF filter assembly 112, and the other output of the two-way power divider 108 is input to the video SAW IF filter assembly 114. Both the data and video SAW IF filter assemblies 112, 114 have independent gain control stages and are commercially available vestigial sideband filters.

The video SAW IF filter assembly 114 is set to have a 4.35 MHz bandwidth. Although the video SAW IF filter assembly 114 could have a conventional 5.45 MHz bandwidth, it would then have a lower signal-to-noise value because of the introduction of residual noise.

The video SAW IF filter assembly 114 feeds a synchronous detector 120 which provides demodulation, tuner AGC control, and video IF AGC control. The synchronous detector 120 used in the present embodiment of the present invention is commercially available from SONY Corporation, P/N CX11431. The synchronous detector 120 creates a carrier at the video frequency and phase aligns it with the picture carrier at 45.75 MHz. The intermediate frequency carrier 150 is mixed with and thus demodulates the bandpass filtered IF input to the synchronous detector 120.

Only a video signal 156 and not the QAM digital data signal is output from the synchronous detector 120 because the QAM digital data is transmitted out-of-phase with respect to the video. In this embodiment, the digital data is transmitted 90 degrees out of phase, albeit at the same carrier frequency, as the video component of the VQM composite TV signal. By using the same carrier for both the video component and the QAM digital data component, atmospheric conditions do not then degrade the relationship between the data and the video components because both are affected equally.

The demodulated video drives a sync processor 146 which recovers and outputs the horizontal sync signal 148, i.e., the 15,734.265 Hz horizontal sync reference from the video signal. The signal to noise (S/N) ratio of the recovered horizontal sync signal 148 is about 47 dB. Reference generator 144 provides a clock signal to the data side 160 of the receiver. In the present embodiment, the output of the reference generator 144 is equal to the recovered horizontal sync signal 148 multiplied by 360 (15,734.265 Hz×360= 5.664 MHz).

It is possible to separately detect the horizontal sync on the data side 160 as opposed to deriving it from the video side 162 of the receiver. However, separate detection of the horizontal sync on the data side 160 might then shift or jitter with respect to that recovered on the video side. Thus, to avoid drift, shifting or jitter of the horizontal sync reference signal used by the data side 160 with respect to the video side 162, horizontal sync 148 is recovered from the video signal, and then shifted 90 degrees by phase shifter 142 for use by the data side 160.

Note that the phase shifter 142, like the phase shifter 118 which phase shifts the carrier frequency 150, shifts 90 degrees. If the carrier is shifted by a value other than 90 degrees by phase shifter 118, then the amount of phase shift performed by phase shifter 142 must be similarly changed. The phase shift of the recovered horizontal sync may be performed either before or after it is multiplied in the reference generator 144.

To recover the digital data, the IF signal 110 fed to the data side 160 of the receiver 100 is input to the video SAW IF filter 112 assembly. The output of the video SAW IF filter 112 is input to a mixer 116 which demodulates the signal with the 90 degree phase-shifted 45.75 MHz IF frequency output from the phase shifter 118. Thus, the mixer 116 outputs vestigial quadrature modulated intrachannel (VQMI) digital data centered at 708 KHz and having a bandwidth of 708 KHz.

The VQMI digital data is input to a variable gain amplifier 122. The amplifier 122 is variable in gain under the control of the QAM demodulator 132. The automatic gain control (AGC) signal 126 is input to the A/D converter 124 to keep the signal input to the A/D converter 124 within range. Thus, most effective use of the A/D converter 124 is accomplished by lowering the gain of the amplifier 122 as necessary to avoid saturation, and increasing the gain of the amplifier 122 as necessary to utilize all bits thereof.

The A/D converter 124 in the present embodiment is a 10-bit A/D converter, which is just adequate for 256 QAM. An 11 bit A/D converter would perform better than a 10 bit A/D converter, and a 12 bit A/D converter would provide a good safety margin for use with 256 QAM. The A/D converter 124 used in the present embodiment is capable of 40 Megasamples per second, but only about 4×708 symbols/ sec=2.83 Megasamples/second) are necessary for good performance in the present embodiment.

The A/D converter 124 is clocked by clock signal 130, which is derived from the output of phase shifter 142 and passed through the QAM modulator 132. The clock signal 130 is referenced to the recovered horizontal sync from the video signal. The A/D converter 124 outputs the recovered aggregate digital data 128 at a rate controlled by the clock signal 130, which in this embodiment is 5.664 Mb/s. The aggregate digital data signal 128 is output to the QAM demodulator 132, which also receives the clock signal 138 from the phase shifter 142. The clock signal 138 from the phase shifter 142 is the same as the clock signal 130 passed on to the A/D converter 124.

The QAM demodulator 132 is effectively a digital multiplier which is commercially available from NATIONAL, HITACHI, BROAD COM and PHILLIPS.

The 10 bit parallel data from the A/D Converter 124 is input to the QAM demodulator 132. Error correction is performed either in the QAM demodulator 132 itself or separate therefrom, and after removal of the error correction overhead the 5.034 Mb/s digital data stream 136 is output together with a 5.034 Mb/s clock for sampling the 5.034 Mb/s digital data stream 136.

The QAM demodulator 132 outputs control signals 140 to the phase shifter 142 to form a phase-locked loop. Conventionally, a voltage controlled oscillator (VCO) might be used to recover the clock signal and could be used with the present invention. However, a VCO might exhibit phase noise which is directly related to the signal-to-noise (S/N) ratio of the incoming signal. As the S/N ratio degrades, the jitter of the clock signal would increase. The present embodiment does not use an external VCO. Rather, jitter is reduced by deriving a signal from the horizontal sync signal 148 and feeding the same to the QAM demodulator 132.

The QAM demodulator 132 controls only the phase—not the frequency of the clock signal 138. Because the recovered horizontal sync signal 148 is very solid, i.e., to within about one part-per-million (ppm), the loop characteristics of the phase-locked loop can be slowed down, providing the receiver 100 with a relatively large immunity to noise. In the present embodiment, the QAM demodulator 132 need only control the phase of the phase shifter 142 ±90 degrees, not a full 360 degrees, therefore providing even a greater reduction of jitter.

The 5.034 Mb/s data stream 136 and the clock 134 are output from the receiver 100 provides a serial data stream for use by any desired data processing device, e.g., MPEG, Ethernet, ATM or the like.

While the invention has been described with reference to the exemplary preferred embodiments thereof, those skilled in the art will be able to make the various modifications to the described embodiments of the invention without departing from the true spirit and scope of the invention. This invention is applicable to TV channel standards in use throughout the world, including NTSC, PAL and SECAM and includes methods, apparatuses and systems for making use of the vestigial portion of the spectrum of a TV channel to carry data or other information transparently without affecting the quality of the composite video signal. Thus, although the invention is described with reference to an embodiment utilizing the NTSC standard, the invention is equally applicable to the PAL, SECAM and any other TV standard having video transmitted with dual or a vestigial sideband.

I claim:

1. A method of transmitting digital data in a television channel without disturbing television transmission quality wherein said channel carries a conventional television signal that includes audio, video and synchronizing information, said method comprising:

modulating a carrier signal with representations of data from a digital data stream thereby to generate said supplemental data signal, generating upper and lower sidebands of said television signal wherein one of said sidebands includes a vestigial sideband of said television signal, removing a portion of said vestigial sideband and substituting therefor a representation of said supplemental data signal, deriving synchronizing information from a residual portion of at least one of said sideband, transmitting a modified television signal that includes a representation of said supplemental data signal, said residual synchronizing information, and said television signal, receiving said modified television signal at a receiver, extracting a synchronizing signal from a sideband of said modified television signal, utilizing said extracted synchronizing signal to clock data from said modified television signal, utilizing said synchronizing information for clocking data from said television signal includes that step of providing a frequency said data clocking signal that is an integer multiple of the frequency of said synchronizing information extracted from said modified television signal; and wherein said supplemental data signal comprises at least a 32 or higher QAM-modulated signal for carrying digital data.

2. The method as recited in claim 1 wherein the average power of said supplemental data signal substantially equals the average power of the removed portion of the vestigial sideband so as to avoid impacting the power loading capacity of a network.

3. The method as recited in claim 2 further including the step of phase-shifting the carrier signals of said supplemental data and composite video signals 90 degrees from each other.

4. The method as recited in claim 3 further including extracting horizontal sync signals from said synchronizing signal, and providing a data rate in said supplement data signal having a frequency that is an integer divisor of the frequency of said horizontal sync signal.

5. A method of transmitting digital data in a television channel without disturbing television transmission quality wherein said channel carries a conventional television signal that includes audio, video and synchronizing information, said method comprising:

modulating a carrier signal with representations of data from a digital data stream thereby to generate said supplemental data signal, generating upper and lower sidebands of said television signal wherein one of said sidebands includes a vestigial sideband of said television signal, removing a portion of said vestigial sideband and substituting therefor a representation of said supplemental data signal, deriving synchronizing information from a residual portion of at least one of said sideband, transmitting a modified television signal that includes a representation of said supplemental data signal, said residual synchronizing information, and said television signal, receiving said modified television signal at a receiver, extracting a synchronizing signal from a sideband of said modified television signal, utilizing said extracted synchronizing signal to clock data from said modified television signal, wherein the average power of said supplemental data signal matches the average power of the portion of the sideband removed in said removing step.

6. A method of transmitting digital data in a television channel without disturbing television transmission quality wherein said channel carries a composite television signal that includes audio, video and synchronizing information, said method comprising:

modulating a carrier signal with representations of data from a digital data stream thereby to generate said supplemental data signal, generating upper and lower sidebands of said television signal wherein one of said sidebands includes a vestigial sideband of said television signal, removing a portion of said vestigial sideband and substituting therefor a representation of said supplemental data signal, deriving synchronizing information from a residual portion of at least one of said sideband, transmitting a modified television signal that includes a representation of said supplemental data signal, said residual synchronizing information, and said television signal, receiving said modified television signal at a receiver, extracting a synchronizing signal from a sideband of said modified television signal, utilizing said extracted synchronizing signal to clock data from said modified television signal, wherein the composite video signal includes a carrier and the supplemental data signal includes a carrier that is phase-shifted from the carrier of the composite video signal.

7. A method of transmitting data over a television channel in a portion of the spectrum occupied by a vestigial sideband of a television signal, said method comprising the steps of removing a portion of said vestigial sideband of said television signal, retaining sufficient synchronizing information in a residual portion of said vestigial sideband, inserting said data-modulated signal in the removed portion of the spectrum of occupied by said vestigial sideband, and transmitting a resulting signal including a combination of said data-modulated signal and a remaining portion of said television signal, wherein respective carriers for the transmitted data signal and said television signal are phase-shifted from each other.

8. A method of transmitting data over a television channel in a portion of the spectrum occupied by a vestigial sideband of a television signal, said method comprising the steps of removing a portion of said vestigial sideband of said television signal, retaining sufficient synchronizing information in a residual portion of said vestigial sideband, inserting said data-modulated signal in the removed portion of the spectrum of occupied by said vestigial sideband, and transmitting a resulting signal including a combination of said data-modulated signal and a remaining portion of said television signal, wherein the average power of the inserted data signal substantially matches the average power of the removed portion of said vestigial sideband.

9. The method as recited in claim 7 comprising extracting television sync signals from a residual portion of a sideband and providing said extracted sync signals both for driving horizontal and vertical sync circuits of a television set and to clock digital data from transmitted data signal.

10. In combination with television signal transmission equipment operative to transmit a modified television signal that includes both video information and a digital data stream, the improvement comprising:
 a. an input for receiving a video signal from a video source,
 b. a mixer for converting said video signal to an intermediate frequency video signal having respective upper and lower sidebands,
 c. a first intermediate filter for bandpassing a first of the respective sidebands on a first side of a center frequency and for bandpassing at least a portion of a second of the respective sidebands for use in recovering synchronizing information,
 d. an input for receiving a digital data stream from a data source,
 e. a data modulator connected to said input for modulating a carrier with said digital data that is clocked in accordance with a clocking signal derived from synchronizing information of said video signal,
 f. a second mixer for converting the modulated digital data signal to an intermediate frequency data signal having respective upper and lower sidebands, said intermediate video and data signals being phase-shifted 90 degrees from each other by a phase shifter,
 g. a second intermediate filter for bandpassing one of said sidebands of said intermediate data signal on a second side of said center frequency of said second intermediate filter, and
 h. a combiner for combining the outputs of said first and second intermediate filters thereby to generate a modified television signal for transmission, wherein said first sideband carries representations of said video signal and said second sideband carries representations of said data signals.

11. In combination with television signal transmission equipment operative to transmit a modified television signal that includes a composite video signal including both video information and a digital data stream, the improvement comprising:
 a. an input for receiving a video signal from a video source,
 b. a mixer for converting said video signal to an intermediate frequency video signal having respective upper and lower sidebands,
 c. a first intermediate filter for bandpassing a first of the respective sidebands on a first side of a center frequency and for bandpassing at least a portion of a second of the respective sidebands for use in recovering synchronizing information,
 d. an input for receiving a digital data stream from a data source,
 e. a data modulator connected to said input for modulating a carrier with said digital data that is clocked in accordance with a clocking signal derived from synchronizing information of said video signal,
 f. a second mixer for converting the modulated digital data signal to an intermediate frequency data signal having respective upper and lower sidebands, said intermediate video and data signals being phase-shifted from each other by a phase shifter,
 g. a second intermediate filter for bandpassing one of said sidebands of said intermediate data signal on a second side of said center frequency of said second intermediate filter,
 h. a combiner for combining the outputs of said first and second intermediate filters thereby to generate a modified television signal for transmission, wherein said first sideband carries representations of said video signal and said second sideband carries representations of said data signals, and
 i. a reference generator for generating a reference clocking signal extracted from synchronizing information contained in said composite video signal, said reference clocking signal being used for generating a data clocking signal for clocking said digital data from said digital data source.

12. The invention as recited in claim 11 wherein the reference clocking signal is extracted from a horizontal sync signal contain in said synchronizing information.

13. The invention as recited in claim 12 wherein the frequency of said reference clocking signal is an integer multiple of the frequency of said data clocking signal.

14. The invention as recited in claim 11 wherein the modulation scheme of said data modulator comprises a two-dimensional modulation scheme including a combination of amplitude modulation and phase or frequency modulation.

15. The invention as recited in claim 11 wherein the modulation scheme of said data modulator comprises quadrature amplitude modulation which is 32 QAM or higher.

16. The invention as recited in claim 11 wherein said first and second intermediate filters comprises SAW filters tuned to an intermediate frequency.

17. The invention as recited in claim 11 wherein filter parameters of said first and second intermediate filters are chosen so to achieve substantial equality between the average power of the sideband containing digital data information and the average power of the sideband of removed by said first intermediate filter.

18. The invention as recited in claim 11 wherein the first and second bandpass filters have matched center frequencies.

19. The invention as recited in claim 11 wherein the center frequency of said first intermediate frequency matches the center frequency of conventional television intermediate signal processing circuitry.

20. A client-server network system utilizing a conventional television channel for transferring digital data between a client and a server without disturbing video signal quality, said network system comprising:

a mixer for converting a video signal to an intermediate frequency video signal having respective first and second sidebands, a first intermediate filter for bandpassing a first sideband of said video signal for use in recovering said video signal and for bandpassing a portion of said second sideband for use in recovering synchronizing information at a client-side receiver, a data modulator for modulating a carrier signal with a digital data clocked in accordance with a clocking signal derived from synchronizing information contained in said video signal, a second mixer for converting the modulated digital data signal to an intermediate frequency data signal having respective first and second sidebands, said intermediate video and data signals being phase-shifted 90 degrees from each other by a phase shifter, a second intermediate filter for bandpassing one of said sidebands of said intermediate data signal, a combiner for combining opposed sideband outputs of said first and second intermediate filters thereby to generate a modified television signal for transmission, wherein said first sideband carries representations of said video signal and second sideband carries representations of said data signals, and a receiver for generating a digital data stream from said modified television signal, said receiver including a circuit for regenerating a signal that carries digital data in a first portion of a vestigial sideband, for extracting synchronizing signals from a second portion of said vestigial sideband, for utilizing said extracted synchronizing signal to clock said digital data from said supplemental data signal, and for supplying said clocked digital data signals to said client.

21. In a television signal transmitting apparatus that transmits a conventional television signal including upper and lower sidebands, an improvement for overlaying a digital data stream within said television signal without affecting picture quality, said improvement comprising a modulator for modulating a carrier with said digital data stream, a sync signal extractor for extracting a sync signal from at least one of the sidebands of said television signal to drive said modulator wherein said sync signal extractor extracts the sync signal from a portion of the vestigial sideband of said television signal, a filtering circuit for stripping at least a portion of one sideband of the television signal, a combining circuit for inserting a sideband of the modulated carrier in a region of the spectrum of the sideband stripped from said television signal thereby to generate a modified television signal for transmission, and a phase-shifter for shifting the relative phases of the carrier modulated by said modulator and the television signal.

22. A method of transmitting digital data in a television channel without disturbing television transmission quality wherein said channel carries a conventional television signal that includes audio, video and synchronizing information, said method comprising:

modulating a carrier signal with representations of data from a digital data stream thereby to generate said supplemental data signal, generating upper and lower sidebands of said television signal wherein one of said sidebands includes a vestigial sideband of said television signal, removing a portion of said vestigial sideband and substituting therefore a representation of said supplemental data signal, deriving synchronizing information from a residual portion of at least one of said sideband, transmitting a modified television signal that includes a representation of said supplemental data signal, said residual synchronizing information, and said television signal, receiving said modified television signal at a receiver, extracting a synchronizing signal from a sideband of said modified television signal, utilizing said extracted synchronizing signal to clock data from said modified television signal, wherein, in said first extracting step, said synchronizing step is extracted from at least the 7th and higher harmonic of said television signal in order to retain sufficient usable quality of said synchronizing signal.

23. Television signal transmission equipment operative to transparently transmit digital data in a modified television signal without disturbing the quality of an original television signal, said equipment comprising:

a mixer for converting said video signal to an intermediate frequency video signal having respective upper and lower sidebands, a first intermediate filter that bandpasses a first of said respective sidebands on a first side of a center frequency and that bandpasses at least a portion of a second of said respective sidebands for use in recovering synchronizing information, an input for receiving a digital data stream from a digital data source, a data modulator for modulating a carrier signal with said digital data that is clocked in accordance with a clocking signal derived from synchronizing information contained in said television signal, a second mixer for converting the modulated digital data signal to an intermediate frequency data signal having respective upper and lower sidebands, said intermediate video and data signals being phase-shifted 90 degrees from each other by a phase shifter, a second intermediate filter for bandpassing one of the sidebands of said intermediate frequency data signal on a second side of said center frequency of said second intermediate filter, and a combiner for combining the outputs of said first and second intermediate filters thereby to generate a modified television signal for transmission, wherein said first sideband carries representations of said video signal and second sideband carries representations of said synchronizing information and said data signals.

24. A communication network utilizing television channels for transferring digital data in a television signal, said network comprising a source of data, a carrier signal modulated by said source of data, a signal processing circuit that substitutes a sideband of said modulated carrier in a portion of the sideband spectrum otherwise occupied by a sideband of said television signal thereby to generate a modified television signal for transmission, and a remote interface for receiving the modified television signal and extracting digital data therefrom, wherein said signal processing circuit substitutes the modulated carrier in a vestigial sideband of said television signal and said receiver extracts digital data from a sideband containing a representation of said modulated carrier wherein sync information is retained in a portion of the vestigial sideband and the remote interface extracts a sync signal from said retained portion, and said signal processing circuit further includes a phase-shifter for shifting the phase of the carrier signal from the phase of said television signal.

* * * * *